US010128489B2

(12) United States Patent
Parans Paranthaman et al.

(10) Patent No.: US 10,128,489 B2
(45) Date of Patent: Nov. 13, 2018

(54) SURFACE MODIFICATIONS FOR ELECTRODE COMPOSITIONS AND THEIR METHODS OF MAKING

(71) Applicant: UT-Battelle, LLC, Oak Ridge, TN (US)

(72) Inventors: Mariappan Parans Paranthaman, Knowville, TN (US); Craig A. Bridges, Oak Ridge, TN (US); Sukeun Yoon, Daejeon (KR)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 15/002,528

(22) Filed: Jan. 21, 2016

(65) Prior Publication Data

US 2016/0141602 A1    May 19, 2016

Related U.S. Application Data

(63) Continuation of application No. 13/645,959, filed on Oct. 5, 2012.

(51) Int. Cl.
| | |
|---|---|
| H01M 4/131 | (2010.01) |
| H01M 4/485 | (2010.01) |
| H01M 4/505 | (2010.01) |
| H01M 4/525 | (2010.01) |
| B82Y 30/00 | (2011.01) |
| H01M 4/04 | (2006.01) |
| H01M 4/1391 | (2010.01) |
| H01M 4/1397 | (2010.01) |
| H01M 4/36 | (2006.01) |
| H01M 4/58 | (2010.01) |
| H01M 4/62 | (2006.01) |
| H01M 4/136 | (2010.01) |
| H01M 10/0525 | (2010.01) |
| H01M 4/02 | (2006.01) |

(52) U.S. Cl.
CPC ............ *H01M 4/131* (2013.01); *B82Y 30/00* (2013.01); *H01M 4/0402* (2013.01); *H01M 4/0442* (2013.01); *H01M 4/0471* (2013.01); *H01M 4/136* (2013.01); *H01M 4/1391* (2013.01); *H01M 4/1397* (2013.01); *H01M 4/366* (2013.01); *H01M 4/485* (2013.01); *H01M 4/505* (2013.01); *H01M 4/525* (2013.01); *H01M 4/5825* (2013.01); *H01M 4/625* (2013.01); *H01M 10/0525* (2013.01); *H01M 2004/028* (2013.01); *H01M 2220/10* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 5,449,577 | A | * | 9/1995 | Dahn ................. C01G 45/1221 423/594.2 |
| 7,678,503 | B2 | | 3/2010 | Manthiram et al. |
| 7,718,319 | B2 | | 5/2010 | Manthiram et al. |
| 7,986,509 | B2 | | 7/2011 | Seymour |
| 2004/0131934 | A1 | | 7/2004 | Sugnaux et al. |
| 2004/0229124 | A1 | * | 11/2004 | Miyamoto ........ H01M 10/0525 429/231.1 |
| 2005/0281727 | A1 | | 12/2005 | Yoshizawa et al. |
| 2007/0212615 | A1 | | 9/2007 | Jost et al. |
| 2008/0168865 | A1 | * | 7/2008 | Zhang ................. H01M 4/5825 75/751 |

(Continued)

FOREIGN PATENT DOCUMENTS

| | | | | |
|---|---|---|---|---|
| CN | 102034975 | A | | 4/2011 |
| CN | 102239586 | A | | 11/2011 |
| CN | 102605339 | A | * 7/2012 | ............ C23C 16/26 |
| CN | 102694164 | A | * 9/2012 | ............ H01M 4/131 |

(Continued)

OTHER PUBLICATIONS

Liu, H., et al., "Mesoporous TiO2-B Microspheres with Superior Rate Performance for Lithium Ion Batteries", Advanced Materials, vol. 23, Issue 30, Aug. 9, 2011, pp. 3450-3454.*
Liu, D., et al., "Synthesis of Pure Phase Disordered LiMn1.45Cr0.1Ni0.45O4 by a Post-Annealing Method", Journal of Power Sources 217 (2012) 400-406.*
Machine translation CN102694164A.*
Machine Translation CN102605339A.*
Stic search by H. Young.*
Zhao, Liang, et al., "Porous Li4Ti5O12 Coated with N-Doped Carbon from Ionic Liquids for Li-Ion Batteries", Advanced Materials, 2011, 23, 1385-1388.*
Machine Translation CN102365781(B) (Year: 2013).*
Ding, Zijing et al., "Towards Understanding the Effects of Carbon and Nitrogen-Doped Carbon Coating on the Electrochemical Performance of $Li_4Ti_5O_{12}$ in Lithium Ion Batteries: A Combined Experimental and Theoretical Study," Phys. Chem. Chem Phys., vol. 13, 2011, pp. 15127-15133.

(Continued)

*Primary Examiner* — Stewart A Fraser
*Assistant Examiner* — Victoria H Lynch
(74) *Attorney, Agent, or Firm* — Brinks Gilson & Lione; Jonathan M. Hartley

(57) ABSTRACT

Compositions and methods of making are provided for surface modified electrodes and batteries comprising the same. The compositions may comprise a base composition having an active material capable of intercalating the metal ions during a discharge cycle and deintercalating the metal ions during a charge cycle, wherein the active material is selected from the group consisting of $LiCoO_2$, $LiMn_2O_4$, $Li_2MnO_3$, $LiNiO_2$, $LiMn_{1.5}Ni_{0.5}O_4$, $LiFePO_4$, $Li_2FePO_4F$, $Li_3CoNiMnO_6$, $Li(Li_aNi_xMn_yCo_z)O_2$, $Li_aMn_{1.5-b}Ni_{0.5-c}M_dO_{4-x}$, and mixtures thereof. The compositions may also comprise an annealed composition covering a portion of the base composition, formed by a reaction of the base composition in a reducing atmosphere. The methods of making comprise providing the base composition and annealing the base electrode in a reducing atmosphere.

19 Claims, 3 Drawing Sheets

(56) References Cited

U.S. PATENT DOCUMENTS

| | | | |
|---|---|---|---|
| 2009/0081102 A1* | 3/2009 | Dai | H01M 4/587 |
| | | | 423/306 |
| 2009/0111024 A1* | 4/2009 | Wurm | C01B 25/375 |
| | | | 429/221 |
| 2010/0279117 A1 | 11/2010 | Gu | |
| 2011/0070495 A1 | 3/2011 | Ban et al. | |
| 2011/0165457 A1* | 7/2011 | Prochazka, Jr. | H01M 2/1646 |
| | | | 429/185 |
| 2011/0245071 A1 | 10/2011 | Tanabe | |
| 2011/0281157 A1 | 11/2011 | Seymour | |
| 2011/0281174 A1 | 11/2011 | Seymour | |
| 2011/0281176 A1 | 11/2011 | Seymour | |
| 2011/0281719 A1* | 11/2011 | Liu | B01J 23/26 |
| | | | 502/1 |
| 2012/0049126 A1* | 3/2012 | Park | C04B 35/447 |
| | | | 252/506 |
| 2012/0189915 A1 | 7/2012 | Cho et al. | |
| 2012/0282522 A1* | 11/2012 | Axelbaum | B82Y 30/00 |
| | | | 429/219 |
| 2013/0078518 A1* | 3/2013 | Thackeray | H01M 4/505 |
| | | | 429/221 |
| 2013/0108920 A1* | 5/2013 | Oladeji | H01M 4/74 |
| | | | 429/199 |
| 2014/0099559 A1 | 4/2014 | Paranthaman et al. | |
| 2017/0098819 A9 | 4/2017 | Loveness et al. | |

FOREIGN PATENT DOCUMENTS

| | | | | |
|---|---|---|---|---|
| CN | 102365781 B | * | 5/2013 | ......... H01M 10/052 |
| JP | 2006310514 A | | 11/2006 | |
| JP | 2007269505 A | | 10/2007 | |
| JP | 2009196869 A | | 9/2009 | |
| JP | 2010009807 A | | 1/2010 | |
| WO | WO 2010/090185 A1 | | 8/2010 | |
| WO | WO 2011/109457 A2 | | 9/2011 | |

OTHER PUBLICATIONS

Hu, Jiezi et al., "Doping Effects on Electronic Conductivity and Electrochemical Performance of $LiFePO_4$," J. Mater. Sci. Technol., vol. 25, No. 3, 2009, pp. 405-409.

Li, Xifei et al., "Superior Cycle Stability of Nitrogen-Doped Graphene Nanosheets as Anodes for Lithium Ion Batteries," Electrochemistry Communications, vol. 13, 2011, pp. 822-825.

Li, Hong et al., "Research on Advanced Materials for Li-ion Batteries," Advanced Materials, vol. 21, 2009, pp. 4593-4607.

Parans Paranthaman, M., "Controlled Surface Modification of $LiMn_{1.5}Ni_{0.5}O_4$ Spinel Cathode Materials for Lithium-ion Batteries," Abstract #398, 220$^{th}$ ECS Meeting, The Electrochemical Society, 2011, 1 page.

Zhao et al., "Porous $Li_4Ti_5O_{12}$ Coated with N-Doped from Ionic Liquids for Li-Ion Batteries," Advanced Materials, Feb. 2, 2011, pp. 1385-1388.

Office Action dated Apr. 26, 2017 in U.S. Appl. No. 13/645,779.

* cited by examiner

SURFACE MODIFICATIONS FOR ELECTRODE COMPOSITIONS AND THEIR METHODS OF MAKING

STATEMENT OF GOVERNMENT INTEREST

The invention was made with government support under contract number DE-AC05-00OR22725 by the Department of Energy. The Government has certain rights in the invention.

RELATED APPLICATIONS

This application claims priority to U.S. application Ser. No. 13/645,959 filed on Oct. 5, 2012, the contents of which is incorporated herein by reference.

BACKGROUND

Electrical energy storage systems have attracted significant attention within the past few decades due to the sustained interest in alternative energy sources which stems from the gradual depletion of oil resources around the world. From this point of view, the development of clean and highly efficient energy storage systems is becoming an even more urgent need. Advanced energy storage systems such as lithium-ion batteries are important approaches to mitigate energy shortage and global climate warming issues that the world is currently facing. High power and high energy density are essential to batteries for applications in electric vehicles, stationary energy storage systems for solar and wind energy, as well as smart grids.

Because conventional lithium-ion batteries are inadequate to meet these needs, advanced materials with high capacity and fast charge-discharge capability are desirable for next generation lithium-ion batteries. Additionally, it is desirable to develop an electrode material with improved conductivity to further improve the rate capability and/or cycling performance.

SUMMARY

Compositions and methods of making are disclosed for modified electrode compositions for use in batteries.

In one embodiment, the electrode for the battery comprises a base composition having an active material capable of intercalating the metal ions during a discharge cycle and deintercalating the metal ions during a charge cycle, wherein the active material is selected from the group consisting of $LiCoO_2$, $LiMn_2O_4$, $Li_2MnO_3$, $LiNiO_2$, $LiMn_{1.5}Ni_{0.5}O_4$, $LiFePO_4$, $Li_2FePO_4F$, $Li_3CoNiMnO_6$, $Li(Li_aNi_xMn_yCo_z)O_2$, $Li_aMn_{1.5-b}Ni_{0.5-c}M_dO_{4-x}$, and mixtures thereof. The electrode further comprises an annealed composition covering a portion of the base composition, formed by a reaction of the base composition in a reducing atmosphere.

In some embodiments, the active material in the base composition of the cathode comprises $LiMn_{1.5}Ni_{0.5}O_4$. In other embodiments, the active material in the base composition of the cathode comprises $Li_aMn_{1.5-b}Ni_{0.5-c}M_dO_4$. M may refer to a metal selected from the group consisting of: Li, Na, K, Mg, Be, Ca, Sr, Ba, Si, Al, Ga, In, Tl, Sc, Ti, V, Cr, Fe, Pt, Os, Cu, or Zn.

In certain embodiments, the capacity of the electrode is at least 125% greater at 3 C, 5 C, or 10 C when compared with an electrode having the same base composition without the annealed composition. In some embodiments, the electrode has a capacity of at least 120 mAh/g at a rate of C/10, 1 C, 3 C, 5 C, or 10 C.

In another embodiment, a battery comprises an anode and a cathode having a base composition with an active material capable of intercalating the metal ions during a discharge cycle and deintercalating the metal ions during a charge cycle, wherein the active material is selected from the group consisting of $LiCoO_2$, $LiMn_2O_4$, $Li_2MnO_3$, $LiNiO_2$, $LiMn_{1.5}Ni_{0.5}O_4$, $LiFePO_4$, $Li_2FePO_4F$, $Li_3CoNiMnO_6$, $Li(Li_aNi_xMn_yCo_z)O_2$, $Li_aMn_{1.5-b}Ni_{0.5-c}M_dO_{4-x}$, and mixtures thereof. The battery further comprises an annealed composition covering a portion of the base composition of the cathode, formed by a reaction the base composition in a reducing atmosphere. The battery further comprises an electrolyte capable of supporting reversible deposition and stripping of metal at the anode, and reversible intercalation and deintercalation of the metal at the cathode.

In some embodiments, the active material in the base composition of the cathode comprises $LiMn_{1.5}Ni_{0.5}O_4$. In other embodiment s, the active material in the base composition of the cathode comprises $Li_aMn_{1.5-b}Ni_{0.5-c}M_dO_{4-x}$. M may be a metal selected from the group consisting of: Li, Na, K, Mg, Be, Ca, Sr, Ba, Si, Al, Ga, In, Tl, Sc, Ti, V, Cr, Fe, Pt, Os, Cu, or Zn.

In some embodiments, the capacity of the battery is at least 125% greater at 3 C, 5 C, or 10 C when compared with an battery having the same anode, electrolyte, and base composition of the cathode without the annealed composition. In certain embodiments, the capacity of the battery is at least 120 mAh/g at a rate of C/10, 1 C, 3 C, 5 C, or 10 C.

In certain embodiments, the base composition of the anode comprises at least 90 wt. % lithium as the primary electrochemically active material of the anode. In other embodiments, the anode comprises mesoporous metal oxide microspheres, having (a) microspheres with an average diameter between 200 nm and 10 μm, and (b) mesopores on the surface and interior of the microspheres, wherein the mesopores have an average diameter between 1 nm and 50 nm and the microspheres have a surface area between 50 $m^2/g$ and 500 $m^2/g$.

In some embodiments, the battery is selected from the group consisting of the following battery types: lithium-ion, aluminum-ion, magnesium-ion, sodium-ion, metal-air, and metal-sulfur, wherein the metal is lithium, aluminum, magnesium, zinc, or sodium. In one particular embodiment, the battery is a lithium-ion battery.

The battery may have the ability to charge from 0% to 50% of the full range capacity in 6 minutes, or an ability to charge from 0% to 33% of the full range capacity in 1 minute. The battery may have a functional discharge capacity of at least 90% of the initial discharge capacity after 100 cycles. The battery may be used in a grid storage application, vehicle battery application, military application, portable electronic device application, medical device application, or standard cell size battery application.

In another embodiment, a method of forming an electrode comprises providing a base electrode composition having an active material comprising $LiMn_{1.5}Ni_{0.5}O_4$. The method further comprises annealing the base electrode composition in a reducing atmosphere. In some embodiments, the reducing atmosphere contains a flowing reducing gas selected from the group consisting of: hydrogen, argon, nitrogen, fluorine, sulfur, carbon monoxide, methane, ammonia, carbon dioxide, and mixtures thereof. In one particular embodiment, the flowing reducing gas is ammonia.

In some embodiments, the method further comprises doping the base electrode composition with a metal oxide prior to the annealing step, therein forming a doped electrode composition comprising $Li_aMn_{1.5-b}Ni_{0.5-c}M_dO_4$. M may be a metal selected from the group consisting of: Li, Na, K, Mg, Be, Ca, Sr, Ba, Si, Al, Ga, In, Tl, Sc, Ti, V, Cr, Fe, Pt, Os, Cu, or Zn.

DETAILED DESCRIPTION

Figure 1:
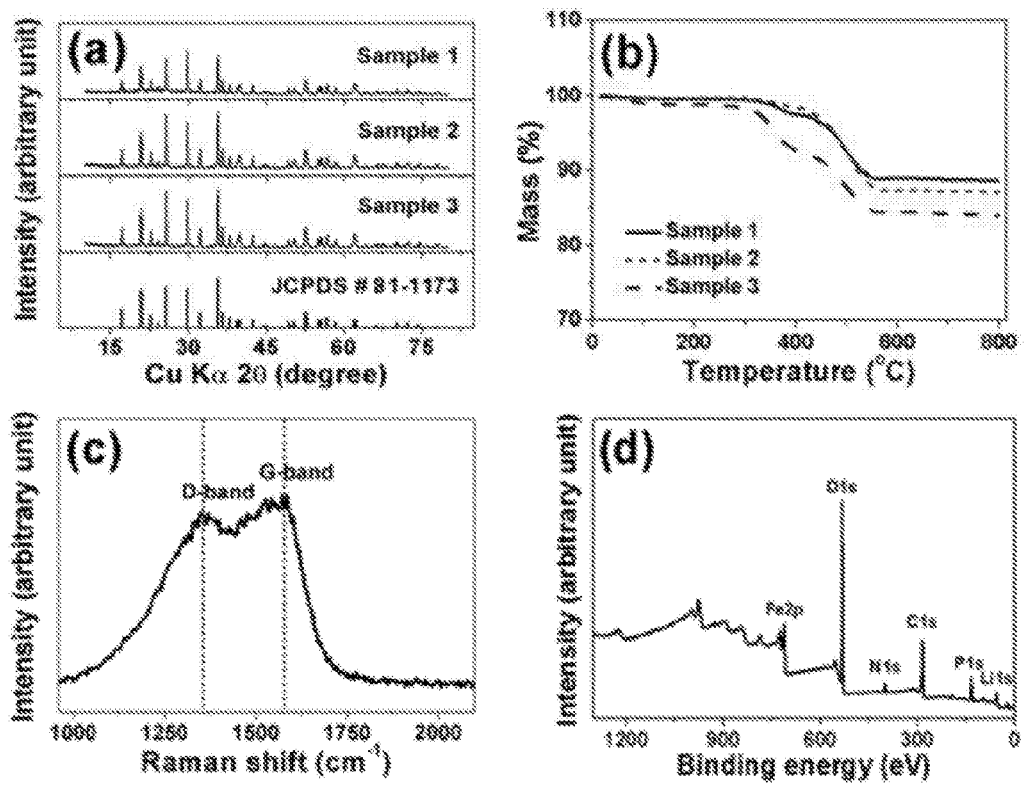
FIG. 1(a) depicts XRD patterns of $LiFePO_4$ samples coated with nitrogen-doped carbon layers.
FIG. 1(b) depicts the carbon-content of $LiFePO_4$ samples using thermo-gravimetric analysis (TGA).
FIG. 1(c) depicts the Raman spectroscopic analysis for a $LiFePO_4$ sample.
FIG. 1(d) depicts the thermo X-ray photoelectron spectrometer XPS survey spectra of a coated $LiFePO_4$ sample.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "lithium-ion" may refer to any ion comprising lithium, including but not limited to $Li^+$.

As used herein, the term "cycle" may refer to the discharge and charge of the capacity of the battery.

As used herein, the term "functional discharge capacity" may refer to a comparison between the current capacity of the battery and the battery's initial capacity. In certain embodiments, the battery is still operable when the functional discharge capacity is more than 50%, 60%, 70%, 80%, or 90% of the initial discharge capacity.

As used herein, the terms "secondary" and "secondary battery" may refer to rechargeable batteries wherein the electrochemical reactions are electrically reversible (i.e., the reaction can be reversed by running a current into the cell to restore the capacity of the battery). In certain embodiments, the secondary battery can achieve a number of cycles (e.g., 100, 1000, 5000, or 10000 cycles) while maintaining a functional discharge capacity (e.g., the discharge capacity is more than 50%, 60%, 70%, 80%, or 90% of the initial discharge capacity).

As used herein, the terms "mesoporous" and "mesoporous structure" may refer to a material or composition containing pores. In certain embodiments, the average pore size of the microsphere structure is between 1 nanometer (nm) and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

As used herein, the terms "C/10," "C/2," "1 C," "2 C," "5 C," "10 C," "20 C," "30 C," "60 C," and the like refer to the "C-rate" or charge-discharge rate (Amp-hour) of the battery.

As used herein, the terms "treating" or "treated" may refer to the process or resulting electrode composition that has been processed or reacted in some manner to improve the conductivity of the composition, thereby improving the rate capability and/or cycling performance of the composition. In some embodiments, the composition is treated through an annealing step, doping step, coating step, or combination thereof.

It has been discovered that performance properties of the electrode compositions may be improved by coating or chemically treating the electrode (modifying the surface of the electrode, in particular). Certain modifications may improve the rate-capabilities and/or improved cycling performance of a battery.

In certain embodiments, batteries with improved electrode compositions may be used in grid storage applications, vehicle battery applications, military applications, portable electronic device applications, medical device applications, or standard cell size battery applications. In one particular embodiment, the battery with an improved electrode composition is used for a grid storage application. In another particular embodiment, the battery is used in a vehicle battery application. In yet another particular embodiment, the battery is used in a portable electronic device application.

In certain embodiments, the improved battery comprises: (1) an anode, (2) a cathode, and (3) an electrolyte capable of supporting reversible deposition and stripping of metal at the anode, and reversible intercalation and deintercalation of the metal at the cathode. The improved electrode composition may be used in one of the following types of batteries: lithium-ion battery, aluminum-ion battery, magnesium-ion battery, sodium-ion battery, metal-air (wherein the metal is lithium, aluminum, magnesium, zinc, or sodium) battery, and metal-sulfur (wherein the metal is lithium, aluminum, magnesium, zinc, or sodium) battery. In one particular embodiment, the improved electrode composition is used in a lithium-ion battery.

Anode

In certain embodiments, the anode comprises an active or base composition capable of intercalating metal ions during a charge cycle and deintercalating metal ions during a discharge cycle. In certain embodiments, the anode comprises lithium metal, including lithium alloys. In some embodiments, the lithium is alloyed with aluminum. In some embodiments, the anode comprises at least 80 wt. %, 90 wt. %, or 95 wt. % lithium as the primary electrochemically active material.

In other embodiments, the anode composition comprises mesoporous metal oxide microspheres, such as those described in U.S. patent application Ser. No. 13/372,795 and U.S. patent application entitled "Mesoporous Metal Oxide Microsphere Electrode Compositions and Their Methods of Making," being concurrently filed herewith, both applications of which are incorporated by reference herein. In some embodiments, the metal oxide is a transition metal oxide selected from the group consisting of titanium oxides (e.g., titanium dioxide and its polymorphs), vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one particular embodiment, the metal oxide is a titanium oxide.

In some embodiments, the average microsphere diameter is between 200 nm and 10 µm. In other embodiments, the average metal oxide microsphere diameter is between 500 nm and 5 µm. In yet other embodiments, the average microsphere diameter is between 1 µm and 2 µm. In one particular embodiment, the average microsphere diameter is approximately 1 µm.

In certain embodiments, the mesopores in the microsphere structure have an average pore diameter between 1 nm and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

In certain embodiments, the microspheres in the mesoporous metal oxide microsphere structure are comprised of nanocrystallites or nanograins having an average grain diameter between 1 nm and 20 nm. In another embodiment, the average grain diameter of the nanocrystallites is between 5 nm and 10 nm. In one particular embodiment, the average grain diameter is approximately 6 nm.

In certain embodiments, the mesoporous metal oxide microsphere structure has a surface area between 50 $m^2/g$ and 500 $m^2/g$. In another embodiment, the surface area is between 100 $m^2/g$ and 300 $m^2/g$. In another embodiment, the surface area of the mesoporous metal oxide microsphere structure is between 100 $m^2/g$ and 200 $m^2/g$.

The conductivity of the anode may be improved by coating at least a portion of the base composition anode surface with a carbon-containing composition. The anode may be coated with a non-metal or metalloid doped carbon composition. In certain embodiments, the anode is coated with a nitrogen-doped carbon composition. In one particular embodiment, the anode comprises lithium metal and a nitrogen-doped carbon coating composition. The source of the nitrogen doping element in the nitrogen-doped carbon coating composition may be by annealing cathodes in flowing ammonia or nitrogen gas or by coating organic amines. In particular, the source of the nitrogen doping element in the nitrogen-doped carbon coating composition may include pyridine, 1-ethyl-3-methylimidazolium bis (trifluoromethanesulfonyl)imide (EMIm-TFSI), 1-ethyl-3-methylimidazolium dicyanamide (EMIm-DCA), and mixtures thereof.

In certain embodiments, the coated anode comprises between 0.1-20 wt. % carbon, between 1-10 wt. % carbon, or between 4-8 wt. % carbon. Additionally, the coated cathode may comprise between 0.01-10 wt. %, 0.05-5 wt. %, or 0.1-1 wt. % of the doping element (e.g., nitrogen).

Cathode

In certain embodiments, the cathode comprises a material capable of intercalating the metal ions during a discharge cycle and deintercalating the metal ions during a charge cycle. In certain embodiments, the cathode is a "high-rate" or "high current rate" cathode capable of a fast charge and discharge capacity.

In certain embodiments, the cathode comprises an active material selected from the group consisting of one or more phases: $LiCoO_2$, $LiMn_2O_4$, $Li_2MnO_3$, $LiNiO_2$, $LiMn_{1.5}Ni_{0.5}O_4$, $LiFePO_4$, $Li_2FePO_4F$, $Li_3CoNiMnO_6$, and $Li(Li_aNi_xMn_yCo_z)O_2$. In one particular embodiment, the cathode comprises $LiFePO_4$.

In other embodiments, the cathode is selected from the group consisting of: $\lambda$-$MnO_2$ (or $\lambda$-$Mn_2O_4$) and $V_2O_5$. In some embodiments, the cathode is "$LiM_xO_y$" [herein defined as a cathode material comprising at least one metal (M) and oxide (O)]. Non-limiting examples of $LiM_xO_y$ cathodes include lithium cobalt oxide, lithium iron phosphate, and lithium manganese oxide.

In certain embodiments, the cathode is $Li_aMn_{1.5-b}Ni_{0.5-c}M_dO_{4-x}$, wherein M comprises any metal element, including alkali metals, alkaline earth metals, transition metals, lanthanides, actinides, post-transition metals, or metalloids. In certain embodiments, "a" is between 0.5-2 or 1-1.4, "b" is between 0-0.5, "c" is between 0-0.5 or 0.-0.17, "d" is between 0-0.33, and "x" is 0 or 1. In some embodiments, the value of "1.5-b", "0.5-c," and "d" add up to a value between 1 or 2. In some embodiments, the metal element is added to the cathode material through a dopant compound. The dopant compound may be a metal oxide. In certain embodiments, the metal (M) in the cathode comprises an element selected from the group consisting of: Li, Na, K, Mg, Be, Ca, Sr, Ba, Si, Al, Ga, In, Tl, Sc, Ti, V, Cr, Fe, Pt, Os, Cu, or Zn.

In certain embodiments, these active components can be mixed with a carbon material (such as carbon black, for example) to make them conducting, and mixed with a binder (such as PVDF binder in N-methylpyrrolidinole, for example) to hold the material together.

In other non-limiting examples, Ti(II) and Mn(II) complexes may also be considered as a transition element for the cathode material.

In another embodiment, the cathode material is $\lambda$-$MnO_2$. In certain embodiments, the cathode material can be prepared in a "reduced" or uncharged state by reacting $MnO_2$ with butyllithium for Li-ion batteries. The cathode may then be "charged" by oxidation of the Mn oxide resulting in expulsion of $Li^+$ ions.

Spinel-type $MnO_2$ may be made by treating $LiMn_2O_4$ with aqueous acid. This $\lambda$-$MnO_2$ has the same structural framework of spinel, but with most of the lithium removed from the tetrahedral sites of the spinel lattice. The mechanism for the conversion of $LiMn_2O_4$ to $\lambda$-$MnO_2$ involves a disproportionation of the $Mn^{3+}$ ions into $Mn^{4+}$ (remains in the solid) and $Mn^{2+}$ (leaches out into the aqueous solution).

In some embodiments, the conductivity of the cathode composition may be improved by coating the surface of the cathode with a carbon-containing composition. The cathode may be coated with a non-metal or metalloid doped carbon composition. In some embodiments, the cathode is coated with a nitrogen-doped carbon composition. In one particular embodiment, the cathode comprises $LiFePO_4$ and a nitrogen-doped carbon coating composition. Non-limiting examples for the source of the nitrogen doping element in the nitrogen-doped carbon coating composition include pyridine, 1-ethyl-3-methylimidazolium bis (trifluoromethanesulfonyl)imide (EMIm-TFSI), 1-ethyl-3-methylimidazolium dicyanamide (EMIm-DCA), and mixtures thereof. In certain embodiments, the coated cathode comprises between 0.1-20 wt. % carbon, between 1-10 wt. % carbon, or between 4-8 wt. % carbon. Additionally, the coated cathode may comprise between 0.01-10 wt. %, 0.05-5 wt. %, or 0.1-1 wt. % of the doping element (e.g., nitrogen).

In other embodiments, the cathode properties (e.g., conductivity, capacity retention) may be improved by chemically modifying the surface of the cathode through an annealing reaction. The annealing reaction may be conducted in a reducing atmosphere to at least partially reduce the metal in the cathode. For example, the reducing atmosphere may include a vacuum or flowing reducing gas to at least partially reduce the metal in the composition. In certain embodiments, the reducing atmosphere is an inert gas. In some embodiments, the reducing atmosphere is a vacuum. In other embodiments, the reducing atmosphere contains a gas selected from the group consisting of: hydrogen, argon, nitrogen, fluorine, sulfur, carbon monoxide, methane, ammonia, carbon dioxide, and mixtures thereof. In one particular embodiment, the annealing reaction is conducted in flowing ammonia gas (i.e., the cathode composition is subjected to a nitridation reaction). In some embodiments, the annealing reaction is carried out at a temperature between 300-800° C., 500-700° C., or 550° C. for a time between 30 minutes and 24 hours, or between 1-15 hours, with a reducing gas (e.g., ammonia) flow rate of approximately 1 mL/min-500 mL/min or about 200 mL/min for 0.5-2 g of cathode material.

In one particular embodiment, the cathode is a $LiMn_{1.5}Ni_{0.5}O_4$ or a doped metal cathode ($Li_aMn_{1.5-b}Ni_{0.5-c}M_dO_4$) (spinel), and is annealed in a flowing ammonia gas atmosphere. Such uniformly dispersed oxy-nitride, metal nitride, or dissolved/adsorbed nitrogen on active $Li_aMn_{1.5-b}Ni_{0.5-c}M_dO_4$ (spinel) cathode material can provide a high capacity retention, continuous chemical stability, tolerance of manganese dissolution at high temperature, improved electron conductivity, and/or reduced irreversible capacity loss. Controlled surface of the active material may have a low resistance and enhance the surface intercalation reaction of a lithium ion, reduce cell polarization, and/or inter-particle resistance and contact between active electrode material and electrolyte. Furthermore, an annealed spinel material may offer a viable, low-cost approach with a power density value much higher than that of the other cathode materials, such as $LiCoO_2$, $LiMn_2O_4$, and $LiFePO_4$. In certain embodiments, the annealed spinel cathodes may have a capacity exceeding 120 mAh/g or 130 mAh/g at various discharge rates, such as C/10, 1 C, 3 C, 5 C, and 10 C.

Electrolyte

Suitable electrolytes for the battery are electrochemically stable compositions within the operation window of the electrodes. In other words, in certain embodiments, a suitable electrolyte is one that is capable of supporting reversible deposition and stripping of metal at the anode, and reversible intercalation and deintercalation of metal at the cathode. Suitable electrolytes may include materials that assist in achieving a wide electrochemical window, good ionic conductivity, improved rate capability, long cycle ability, good capacity retention, and compatibility with the anode and cathode materials.

In certain embodiments, the electrolyte is a metal salt. The metal salt may be dissolved in an organic solvent such as ethylene carbonate, dimethyl carbonate, diethyl carbonate, and combinations thereof. In some embodiments, the battery is a lithium-ion battery and the electrolyte is a lithium salt selected from the group consisting of: $LiPF_6$, $LiBF_4$, and $LiClO_4$.

In certain embodiments, the electrolyte materials may be optimized through the addition of suitable co-solvents that may assist in reducing viscosity (increasing mobility) and/or increasing charge transfer number (increasing salt dissociation).

Performance

In certain embodiments, an electrode or battery comprising an electrode coated with a doped carbon composition has an improved capacity over an uncoated electrode or undoped carbon coated electrode. Further, in certain embodiments, an electrode or battery comprising an electrode coated with a nitrogen-doped carbon composition has an improved capacity in comparison to a similar undoped carbon coated electrode. In some embodiments, the doped carbon coated electrode has at least a 10% improved capacity at 3 C, or at least a 30% improved capacity at 5 C.

In certain embodiments, the doped carbon coated electrodes (e.g., nitrogen-doped carbon coated $LiFePO_4$) have a capacity (rate performance) of at least 125 mAh/g at a rate of C/10, a capacity of at least 100 mAh/g at a rate of 3 C, or a capacity of at least 80 mAh/g at a rate of 5 C. In one particular embodiment, a nitrogen doped carbon coated $LiFePO_4$ cathode has a capacity of approximately 125 mAh/g at C/10, 120 mAh/g at 1 C, 110 mAh/g at 3 C, or 98 mAh/g at 5 C.

In certain embodiments, a cathode that has undergone an annealing reaction has an improved capacity over an unreacted cathode. In some embodiments, the annealed cathode has a capacity of at least 120 mAh/g or 130 mAh/g at C/10, 1 C, 3 C, 5 C, or 10 C. In some embodiments, the annealed cathode has at least a 125% or 150% improved capacity over a similar, untreated cathode at 3 C, 5 C, or 10 C. In one particular embodiment, an annealed $LiMn_{1.5}Ni_{0.5}O_4$ spinel cathode has at least a 125% or 150% improved capacity over a similar, untreated $LiMn_{1.5}Ni_{0.5}O_4$ spinel cathode at 3 C, 5 C, or 10 C.

In certain embodiments, the battery comprising a doped carbon coated electrode (e.g., nitrogen-doped carbon coated $LiFePO_4$) has an improved charge and discharge rates. In some embodiments, the battery can discharge 50% of the full range capacity in approximately 6 minutes. In other embodiments, the battery can be charged from 0% to 50% of the full range capacity in 6 minutes. In yet other embodiments, the battery can be discharge 33% of the full range capacity in approximately 1 minute. In certain embodiments, the battery can be charged from 0% to 33% of the full range capacity in 1 minute.

In certain embodiments, the battery is a secondary battery capable of having at least 100, 1000, 5000, or 10000 cycles prior to battery failure. In some embodiments, battery failure is related to the functional discharge capacity becoming only 50%, 60%, 70%, 80%, or 90% of the initial discharge capacity after a number of cycles. In other embodiments, battery failure is related to the inability to recharge the battery due to dendrite formation, oxide film formation, or other buildup on the anode or cathode. In one particular embodiment, the battery is capable of having a functional discharge capacity greater than 50% of the initial discharge capacity after 100 cycles. In another embodiment, the secondary battery is capable of having a functional discharge capacity greater than 90% of the initial discharge capacity after 100 cycles.

Methods of Making

In certain embodiments, methods of making the battery comprise providing an anode. In certain embodiments, the methods further comprise providing a high-rate capable cathode. In certain embodiments, the methods further comprise providing an electrolyte capable of supporting reversible deposition and stripping of metal at the anode, and reversible intercalation and deintercalation of the metal at the cathode. The anode may comprise lithium metal or a lithium alloy. In some embodiments, the anode comprises at least 80 wt. %, 90 wt. %, or 95 wt. % lithium as the primary electrochemically active material. In other embodiments, the anode comprises a mesoporous metal oxide microsphere composition, such as those described in U. U.S. patent application Ser. No. 13/372,795 and U.S. patent application entitled "Mesoporous Metal Oxide Microsphere Electrode Compositions and Their Methods of Making," being concurrently filed herewith, both applications of which are incorporated by reference herein.

In some embodiments, the surface of the anode may be coated with a doped carbon composition, such as a non-metal or metalloid doped carbon composition. In some embodiments, the anode is coated with a nitrogen-doped carbon composition. In one particular embodiment, the anode comprises lithium and a nitrogen-doped carbon coating composition.

In certain embodiments, the surface of the cathode (e.g., $LiFePO_4$) may be coated with a doped carbon composition, such as a non-metal or metalloid doped carbon composition. In some embodiments, the cathode is coated with a nitrogen-doped carbon composition. In one particular embodiment, the cathode comprises $LiFePO_4$ and a nitrogen-doped carbon coating composition. Non-limiting examples for the source of the nitrogen doping element in the nitrogen-doped carbon coating composition include pyridine, 1-ethyl-3-methylimidazolium bis (trifluoromethanesulfonyl)imide (EMIm-TFSI), 1-ethyl-3-methylimidazolium dicyanamide (EMIm-DCA), and mixtures thereof. The coating step may be conducted through a hydrothermal process followed by post-annealing in the presence of an ionic liquid. For example, 1-ethyl-3-methylimidazolium bis (trifluoromethanesulfonyl)imide (EMIm-TFSI) can be mixed with an cathode (e.g., $LiFePO_4$) powder and heated at an elevated temperature in a flowing inert gas atmosphere. In certain embodiments, the mixture may be heated to at least 300° C., at least 500° C., or at least 700° C. The inert gas atmosphere may be a noble gas, such as argon. The time held at the elevated temperature may be at least 30 minutes, at least 60 minutes, or at least 90 minutes. In one particular embodiment, the coating step involves mixing 1-ethyl-3-methylimidazolium bis (trifluoromethanesulfonyl)imide (EMIm-TFSI) with $LiFePO_4$ powder and heating the mixture to 700° C. in a flowing argon atmosphere for 90 min.

In certain embodiments, the coating over the surface of the cathode is between 1-100 nm, 5-50 nm, or 10-15 nm in thickness. The coated cathode composition may comprise between 0.1-20 wt. % carbon, between 1-10 wt. % carbon, or between 4-8 wt. % carbon. Additionally, the coated cathode composition may comprise between 0.01-10 wt. %, 0.05-5 wt. %, or 0.1-1 wt. % of the doping element (e.g., nitrogen, chromium).

In some embodiments, batteries for grid storage applications may be formed using the improved electrode compositions described. In other embodiments, batteries for vehicle applications may be formed. In yet other embodiments, batteries for military applications may be formed. In yet other embodiments, batteries for portable electronic devices may be formed. In some embodiments, batteries for medical device applications may be formed. In certain embodiments, batteries for standard cell size battery applications may be formed.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

EXAMPLES

Various chemically modified cathodes were formed and tested for their performance characteristics.

Example 1

Nitrogen Doped Carbon Coated $LiFePO_4$ Electrode

Rod-like $LiFePO_4$ with a nitrogen-doped carbon layer was prepared by the following procedure. First, the rod-like $LiFePO_4$ powders were obtained by hydrothermal reaction. An aqueous solution of LiOH and glucose was first stirred for 1 h. An aqueous solution of the iron sulfate heptahydrate ($FeSO_4 \cdot 7H_2O$, 99%, Alfa) and ammonium hydrogen phosphate (($NH_4)_2HPO_4$, 99%, Alfa) was then added to this mixture so that the Li:Fe:P molar ratio was 2:1:1 and $Fe^{2+}$ to glucose molar ratio was 2:1. 40 mL of the transparent solution obtained was transferred into a 100 mL Teflon-lined autoclave and heated at 220° C. for 24 h with a heating/cooling rate of 2° C./min. The resultant slurry was then filtered and washed with deionized water (DI water) before drying in a vacuum oven. Different amounts of 0.1 mL, 0.2 mL, and 0.3 mL 1-ethyl-3-methylimidazolium bis (trifluoromethanesulfonyl)imide (EMIm-TFSI) were mixed with 0.5 g of as-prepared rod-like $LiFePO_4$ powders (the obtained samples were named as Sample 1, Sample 2, and Sample 3), respectively. Samples 1, 2, and 3 were heated to 700° C. in flowing argon atmosphere for 90 min.

Example 2

Annealing/Nitridation of $Li_aMn_{1.5-b}Ni_{0.5-c}M_dO_4$ Cathode

An annealed cathode is prepared by providing a cathode material comprising $Li_aMn_{1.5-b}Ni_{0.5-c}M_dO_4$, The cathode material is then annealed under $NH_3$ gas at 550° C. (am-monolysis), with a $NH_3$ flow rate of 200 mL/min, for between 1 and 15 h. The annealing process results in forming a conducting nitradated cathode material.

Material Characterization:

The compositions can be characterized with a Scintag X-ray diffractometer with Cu Kα radiation, Perkin-Elmer series 7 Thermal Analysis System thermo-gravimetric analysis (TGA), Thermo X-ray photoelectron spectrometer (XPS), WITec Raman spectroscopy with a 512 nm laser excitation, Hitachi S-4800 FEG scanning electron microscope (SEM), Hitachi HF-3300 transmission electron microscope (TEM), and electrochemical charge-discharge measurements.

Electrochemical Evaluation:

Regarding the doped coated cathodes, the electrodes were fabricated with a slurry consisting of 70 wt. % of the as-synthesized active material $LiFePO_4$ composition, 20 wt. % carbon black (e.g. Super-S or Super 45 carbon black), and 10 wt. % polyvinylidene fluoride (PVDF) dissolved in N-methyl-2-pyrrolidone (NMP). The electrodes were spread onto an aluminum foil and were dried in a vacuum oven at 120° C. for approximately 12 hours before transferring into an Argon-filled glove box.

Regarding the annealed cathodes (via nitridation), the electrodes were fabricated with a slurry consisting of 80 wt. % of the as-synthesized annealed cathode material was spread onto an aluminum foil, 10 wt. % carbon black (Super 45 carbon black), and 10 wt. % polyvinylidene fluoride (PVDF) dissolved in N-methyl-2-pyrrolidone (NMP). The electrodes were dried in a vacuum oven before transferring into an Argon-filled glove box.

Coin cells (CR2032) were fabricated using lithium metal as the counter electrode, Celgard 2325 as the separator, and $LiPF_6$ (1 M) in ethylene carbonate/dimethyl carbonate/diethyl carbonate (EC/DMC/DEC, 1:1:1 vol. %) or ethylene carbonate/diethyl carbonate (1:1 vol. %) as the electrolyte.

The cells could be tested using an Arbin BT2000 charger and a Princeton Applied Research VersaSTAT 4 potentiostat. Certain charge-discharge experiments were performed galvano-statically at a constant current density of 15.2 mA/g (C/10) of active material within the voltage range of 2 and 4.3 V vs. $Li/Li^+$ or between 3.5 and 5.0 V. Certain electrochemical impedance spectroscopic analyses (EIS) were carried out with a VersaSTAT 4 by applying a 10 mV amplitude signal in the frequency range of 10 kHz to 0.01 Hz.

Results:

The XRD patterns of rod-like $LiFePO_4$ coated with nitrogen-doped carbon layers are shown in FIG. 1(a). For all of the samples obtained, all of the reflections could be indexed on the basis of the orthorhombic $LiFePO_4$ olivine structure-type (Pnma, JCPDS No. 81-1173).

The carbon content in the coated $LiFePO_4$ specimens was calculated using TGA methods, as shown in FIG. 1(b). They show a weight loss corresponding primarily to the removal of carbon from the samples as $CO_2$, indicating that samples 1, 2 and 3 evolve to approximately 12, 14, and 18 wt. % nitrogen-doped carbon, respectively. Sample 1 was further investigated by Raman spectroscopic analysis, as shown in FIG. 1(c). The modes at 1582 and 1357 $cm^{-1}$ correspond to, respectively, the G (ordered) and D (disordered) bands. The integrated intensity ratio ID/IG is an indication of the degree of graphitization. A high intensity ratio of 0.9, as compared to 0.09 in ordered synthetic graphite indicates a higher degree of disorder for the carbon present in the coated $LiFePO_4$.

The XPS survey spectra of coated $LiFePO_4$ rods are shown in FIG. 1(d). The peaks of P 1s, C 1s, N 1s, O 1s, and Fe 2p can be seen. Multiple C-bonding configurations were observed that were consistent with C/0 and C/N bonding. Likewise, the N 1s spectra showed multiple bonding configurations, also consistent with C/N bonding.

Figure 2:
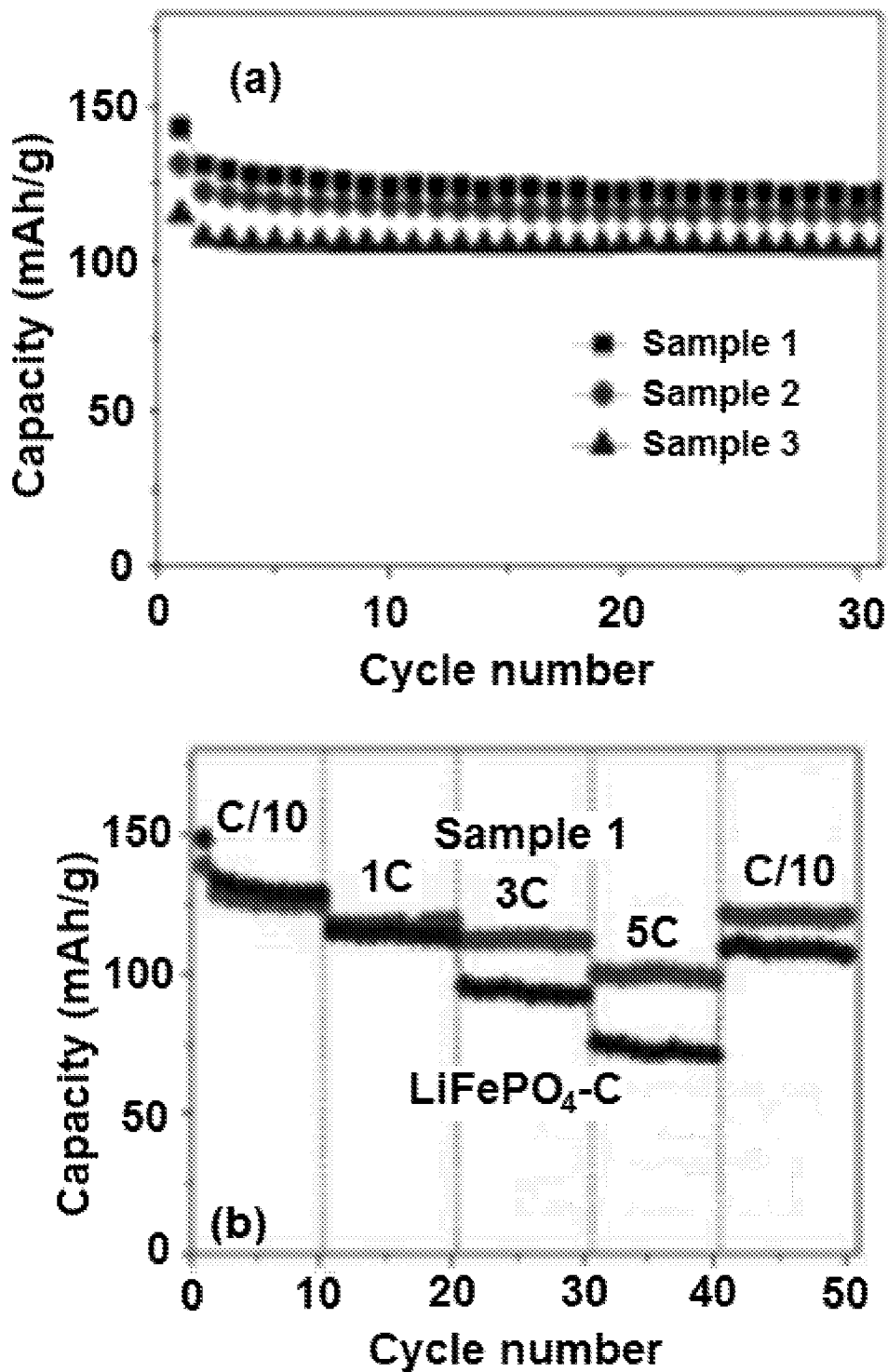
FIG. 2(a) depicts the cycling performance of coated $LiFePO_4$ samples at C/10.
FIG. 2(b) depicts the cycling performance of coated $LiFePO_4$ samples at C/10, 1 C, 3 C, and 5 C.

FIGS. 2(a) and 2(b) show electrochemical performances for coated rod-like $LiFePO_4$ samples. The cyclability of the coated rod-like $LiFePO_4$ for all three samples between 4.3 and 2 V at C/10 are compared in FIG. 2(a). All three coated $LiFePO_4$ samples show good cyclability. Particularly, Sample 1 exhibits the best capacity retention of 122 mAh/g after 30 cycles among the three rod samples. The improved cyclability is related to the nitrogen-doped carbon layer and favorable morphology of the material, which is consistent with reports that coatings provide enhanced electrical conductivity between the substrate and the electrode. The rate and cycling performance of the coated rod-like $LiFePO_4$ samples are shown in FIG. 2(b). For comparison, a rod-like $LiFePO_4$ sample coated with carbon but without nitrogen ($LiFePO_4$—C) was prepared using glucose. The coated $LiFePO_4$ samples exhibit significantly higher rate capability than the LiFePO4-C sample; for example, the coated sample retains a high capacity of 98 mAh/g at 5 C rates compared to a capacity of 73 mAh/g for the $LiFePO_4$—C sample, which implies that coated samples have a lower polarization inside the electrode.

Figure 3:
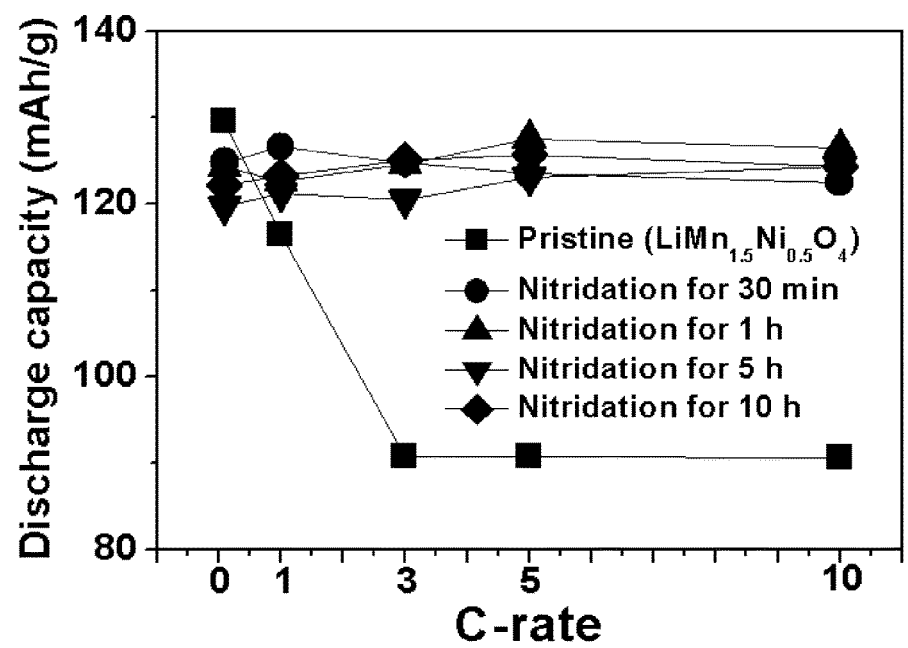
FIG. 3 depicts the discharge capacity of untreated and treated (annealed) $LiMn_{1.5}Ni_{0.5}O_4$ cathodes at C/10, 1 C, 3 C, 5 C, and 10 C.

FIG. 3 compares the discharge capacity/rate capability between an untreated $LiMn_{1.5}Ni_{0.5}O_4$ cathode, and various $LiMn_{1.5}Ni_{0.5}O_4$ cathodes that have undergone annealing/nitridation reactions for various periods of time (i.e., 30 min, 1 hour, 5 hours, and 10 hours). The modified/annealed samples exhibit improved rate capabilities over the untreated sample, and show stability even at 10 C.

What is claimed is:

1. A cathode for a battery comprising:
   a base composition having an active material capable of intercalating metal ions during a discharge cycle and deintercalating the metal ions during a charge cycle, wherein the active material comprises an active material selected from: $Li_2MnO_3$, $LiMn_{1.5}Ni_{0.5}O_4$, $Li_3CoNiMnO_6$, $Li_aMn_{1.5-b}Ni_{0.5-c}M_dO_{4-x}$, and mixtures thereof, wherein "a" is between 0.5-2 or 1-1.4, "b" is between 0-0.5, "c" is between 0-0.5 or 0-0.17, "d" is between 0-0.33, and "x" is 0 or 1, and wherein M is a metal selected from the group consisting of: Li, Na, K, Mg, Be, Ca, Sr, Ba, Si, Al, Ga, In, Tl, Sc, Ti, V, Cr, Fe, Pt, Os, Cu, and Zn; and
   an annealed nitrogen-doped carbon coating composition covering a portion of the base composition, formed by a reaction of the base composition in a reducing atmosphere,
   wherein the source of the nitrogen doping element in the nitrogen-doped carbon coating composition is selected from the group consisting of 1-ethyl-3-methylimidazolium bis (trifluoromethanesulfonyl) imide (EMIm-TFSI), 1-ethyl-3-methylimidazolium dicyanamide (EMIm-DCA), and mixtures thereof.

2. The cathode of claim 1, wherein a capacity of the cathode is at least 125% greater at 3 C, 5 C, or 10 C when compared with an electrode having the same base composition without the annealed nitrogen-doped carbon coating composition.

3. The cathode of claim 1, having a capacity of at least 120 mAh/g at a rate of C/10, 1 C, 3 C, 5 C, or 10 C.

4. A battery comprising:
   an anode having a base composition;
   the cathode of claim 1; and
   an electrolyte capable of supporting reversible deposition and stripping of metal at the anode, and reversible intercalation and deintercalation of the metal at the cathode.

5. The battery of claim 4, wherein a capacity of the battery is at least 125% greater at 3 C, 5 C, or 10 C when compared with an battery having the same anode, electrolyte, and base composition of the cathode without the annealed nitrogen-doped carbon coating composition.

6. The battery of claim 4, wherein the base composition of the anode comprises at least 90 wt. % lithium as the primary electrochemically active material of the anode.

7. The battery of claim 4, wherein the anode comprises mesoporous metal oxide microspheres, having (a) microspheres with an average diameter between 200 nm and 10 μm, and (b) mesopores on a surface and an interior of the microspheres, wherein the mesopores have an average diameter between 1 nm and 50 nm and the microspheres have a surface area between 50 $m^2/g$ and 500 $m^2/g$.

8. The battery of claim 4, wherein the battery is selected from the group consisting of the following battery types: lithium-ion, aluminum-ion, magnesium-ion, sodium-ion, metal-air, and metal-sulfur, wherein the metal is lithium, aluminum, magnesium, zinc, or sodium.

9. The battery of claim 4 having an ability to charge from 0% to 50% of the full range capacity in 6 minutes, or an ability to charge from 0% to 33% of full range capacity in 1 minute.

10. The battery of claim 4 having a functional discharge capacity of at least 90% of initial discharge capacity after 100 cycles.

11. The battery of claim 4, wherein the battery is used in a grid storage application, vehicle battery application, military application, portable electronic device application, medical device application, or standard cell size battery application.

12. The cathode of claim 1, wherein the annealed nitrogen-doped carbon coating over a surface of the cathode is between 1-100 nm in thickness and the coated cathode comprises 0.1- 20 wt. % carbon.

13. The cathode of claim 1, wherein the active material is selected from: $Li_2MnO_3$, $Li_3CoNiMnO_6$, and mixtures thereof and
wherein the source of the nitrogen doping element in the nitrogen-doped carbon coating composition is selected from the group consisting of 1-ethyl-3-methylimidazolium bis (trifluoromethanesulfonyl) imide (EMIm-TFSI), 1-ethyl-3-methylimidazolium dicyanamide (EMIm-DCA), and mixtures thereof.

14. A method of forming a cathode, the method comprising:
providing a base cathode composition having an active material comprising $LiMn_{1.5}Ni_{0.5}O_4$;
annealing the base cathode composition in a reducing atmosphere to form a nitrogen-doped carbon coating composition, wherein the coating over a surface of the cathode is between 1-100 nm in thickness and the coated cathode comprises 0.1- 20 wt. % carbon; and
doping the base cathode composition with a metal oxide prior to the annealing step, therein forming a doped cathode composition comprising $Li_aMn_{1.5-b}Ni_{0.5-c}M_dO_4$, wherein "a" is between 0.5-2 or 1-1.4, "b" is between 0-0.5, "c" is between 0-0.5 or 0-0.17, and "d" is between 0-0.33, and wherein M is a metal selected from the group consisting of: Li, Na, K, Mg, Be, Ca, Sr, Ba, Si, Al, Ga, In, Tl, Sc, Ti, V, Cr, Fe, Pt, Os, Cu, and Zn;
wherein the source of the nitrogen doping element in the nitrogen-doped carbon coating composition is selected from the group consisting of 1-ethyl-3-methylimidazolium bis (trifluoromethanesulfonyl) imide (EMIm-TFSI), 1-ethyl-3-methylimidazolium dicyanamide (EMIm-DCA), and mixtures thereof.

15. The method of claim 14, wherein the reducing atmosphere contains a flowing reducing gas selected from the group consisting of: hydrogen, argon, nitrogen, fluorine, sulfur, carbon monoxide, methane, ammonia, carbon dioxide, and mixtures thereof.

16. The method of claim 15, wherein the flowing reducing gas is ammonia.

17. A cathode for a battery, the cathode comprising:
a base composition having an active material capable of intercalating the metal ions during a discharge cycle and deintercalating the metal ions during a charge cycle, wherein the active material is selected from the group consisting of $Li_2MnO_3$, $LiMn_{1.5}Ni_{0.5}O_4$, $Li_3CoNiMnO_6$, $Li_aMn_{1.5-b}Ni_{0.5-c}M_dO_{4-x}$, and mixtures thereof, wherein "a" is between 0.5-2 or 1-1.4, "b" is between 0-0.5, "c" is between 0-0.5 or 0-0.17, "d" is between 0-0.33, and "x" is 0 or 1, wherein M is a metal selected from the group consisting of: Li, Na, K, Mg, Be, Ca, Sr, Ba, Si, Al, Ga, In, Tl, Sc, Ti, V, Cr, Fe, Pt, Os, Cu, and Zn; and
an annealed nitrogen-doped carbon coating composition covering a portion of the base composition, formed by a reaction of the base composition in a flowing ammonia gas atmosphere, the annealed composition comprising uniformly dispersed oxy-nitride, metal nitride, or dissolved/adsorbed nitrogen.

18. The cathode of claim 17, wherein the active material in the base composition of the cathode comprises $LiMn_{1.5}Ni_{0.5}O_4$.

19. The cathode of claim 17, wherein the coated cathode comprises between 0.01-10 wt. %, 0.05-5 wt. %, or 0.1-1 wt. % nitrogen.

* * * * *